US009694516B2

(12) United States Patent
Joern et al.

(10) Patent No.: US 9,694,516 B2
(45) Date of Patent: Jul. 4, 2017

(54) FIXING THREAD FOR SEWING TOGETHER REINFORCING FIBERS

(75) Inventors: Paul Joern, Hamburg (DE); Ulrich Eberth, Stade (DE)

(73) Assignee: Airbus Operations GmbH, Hamburg (DE)

( * ) Notice: Subject to any disclaimer, the term of this patent is extended or adjusted under 35 U.S.C. 154(b) by 1610 days.

(21) Appl. No.: 11/988,899

(22) PCT Filed: Jul. 24, 2006

(86) PCT No.: PCT/EP2006/064578
§ 371 (c)(1),
(2), (4) Date: Mar. 1, 2010

(87) PCT Pub. No.: WO2007/010053
PCT Pub. Date: Jan. 25, 2007

(65) Prior Publication Data
US 2010/0143716 A1    Jun. 10, 2010

(30) Foreign Application Priority Data
Jul. 22, 2005 (DE) .................. 10 2005 034 394

(51) Int. Cl.
*B29B 11/16* (2006.01)
*B29C 70/20* (2006.01)
*D02G 3/40* (2006.01)

(52) U.S. Cl.
CPC ............ *B29B 11/16* (2013.01); *B29C 70/20* (2013.01); *D02G 3/402* (2013.01);
(Continued)

(58) Field of Classification Search
CPC ......... B29B 11/16; B29B 15/08–15/14; B32B 18/00; B32B 37/00; B32B 5/28;
(Continued)

(56) References Cited
U.S. PATENT DOCUMENTS

| 4,741,873 A | 5/1988 | Fischer et al. |
| 4,764,427 A | 8/1988 | Hara et al. |

(Continued)

FOREIGN PATENT DOCUMENTS

| DE | 30 12 288 | 10/1981 |
| EP | 0351201 | 1/1990 |

(Continued)

OTHER PUBLICATIONS

Full English translation of JP-02133632A, published May 22, 1990, pp. 1-13.*
Complete Textile Glossary, published by Celanese Acetate LLC, copyright 2001, pp. 1-7.*
International Search Report and Written Opinion dated Oct. 4, 2006.
Japanese Office Action for Application No. 2008-521992 dated May 13, 2011.

(Continued)

*Primary Examiner* — Scott R Walshon
(74) *Attorney, Agent, or Firm* — Jenkins, Wilson, Taylor & Hunt, P.A.

(57) ABSTRACT

The invention relates to a fixing thread 1, 5, 10, 16 for sewing together reinforcing fibers, in particular to form a fiber preform, for the production of a fiber-reinforced composite component by means of impregnation with a curable polymer material.
According to the invention, the fixing thread 1, 5, 10, 16 has an interface 4, 9, 15, 19 for locally increasing the ductility of a matrix formed by the curable polymer material and has at least one core thread 2, 6, 11, 12, 17, so as in particular to reduce the tendency for microcracks to form in the matrix of the finished composite component in the regions where the fixing threads 1, 5, 10, 16 penetrate.
The interface 4 may be formed, for example, by an enclosure of the core thread 1 by a thermoplastic polymer material, for example by polyethylene, polypropylene or the like.

14 Claims, 1 Drawing Sheet

Figure 1:
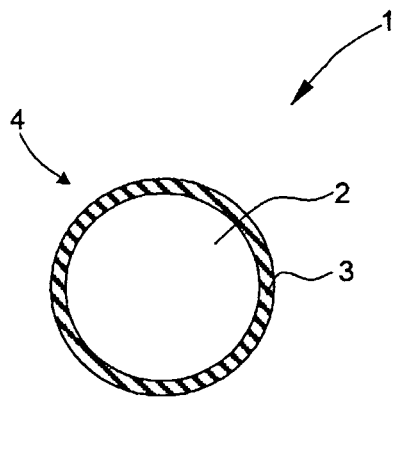

(52) U.S. Cl.
CPC .... *Y10T 428/2929* (2015.01); *Y10T 428/2933* (2015.01); *Y10T 428/2936* (2015.01)

(58) Field of Classification Search
CPC ....... B29C 70/22; B29C 70/54; B29C 70/543; B29C 70/226; B29C 70/20; B29C 70/10; B29C 70/24; B29K 105/06; B29K 2105/108; C08J 5/04–5/10; C08J 5/24; C04B 35/83; C04B 2235/6581; C04B 2235/656; C04B 35/573; C04B 2235/5268; C04B 2235/94; C04B 2237/38; C04B 2235/77; C04B 2235/616; C04B 35/522; C04B 35/806; C04B 2237/365; D02G 1/00–3/48; D02G 3/402; D02G 3/404; D02G 3/367; D06B 3/045; D06M 23/06; D06M 10/005; D06M 10/001; D06M 14/18; D06M 15/55; D06M 10/10; D06P 5/2005; D06P 1/44; D02J 1/00–13/00; D04H 13/00; D04H 3/002; D04H 3/115; D04H 3/04; D04H 1/005; D04H 1/52; D04H 3/10; D04B 21/165; Y10T 428/2936; Y10T 428/2933; Y10T 428/2929
USPC .... 428/113, 195.1, 198, 257, 258, 296, 373, 428/375, 370, 102–104, 223, 387, 111, 428/542.8, 389.9, 297.7, 386, 299.4; 442/179, 64, 71–76; 57/211, 251, 290, 57/236, 12, 210, 232, 313, 7, 903, 243, 57/250, 295, 309, 310, 6
See application file for complete search history.

(56) References Cited

U.S. PATENT DOCUMENTS

| | | | |
|---|---|---|---|
| 4,906,506 A | * | 3/1990 | Nishimura et al. ............ 428/113 |
| 5,439,627 A | | 8/1995 | De Jager |
| 5,749,211 A | | 5/1998 | Kimura et al. |
| 5,874,151 A | * | 2/1999 | Cohee et al. ................. 428/102 |
| 6,109,016 A | * | 8/2000 | Geirhos ......................... 57/290 |
| 6,268,047 B1 | * | 7/2001 | Mulder et al. ............. 428/298.1 |
| 7,138,345 B2 | * | 11/2006 | Wadahara et al. ............ 442/179 |
| 2005/0059309 A1 | | 3/2005 | Tsotsis |

FOREIGN PATENT DOCUMENTS

| | | |
|---|---|---|
| EP | 0432439 | 6/1991 |
| JP | 54-103441 | 8/1979 |
| JP | 59002842 A | 1/1984 |
| JP | 0272083 | 6/1988 |
| JP | 0303499 | 2/1989 |
| JP | 01-319103 | 12/1989 |
| JP | 02133632 | 5/1990 |
| RU | 2094229 | 10/1997 |
| WO | WO 02/098961 | 12/2002 |

OTHER PUBLICATIONS

German Office Action for Application No. 10 2005 034 394.5 dated Apr. 8, 2014.
Chinese Office Action for Application No. 200680026872 dated Jan. 24, 2011.

* cited by examiner

FIXING THREAD FOR SEWING TOGETHER REINFORCING FIBERS

The invention relates to a fixing thread for sewing together reinforcing fibers, in particular to form a fiber preform, for the production of a fiber-reinforced composite component by means of impregnation with a curable polymer material.

For the production of fiber-reinforced composite components with curable polymer materials, for example epoxy or polyester resins, often textile sewing methods are used to form the fiber preforms that are required for reinforcement from reinforcing fibers and/or woven reinforcing fabrics. Technical reinforcing textiles, such as for example aramid fibers, glass fibers or carbon fibers, are used inter alia as fixing fibers.

In addition, for example for reasons of better processability, non-reinforcing threads, such as for example polyester filaments, which are elastic but in the later composite component can only withstand low mechanical loads, or the like are used. If a fixing thread which acts simultaneously as a reinforcing fiber is used, an increase in the strength and rigidity of the composite component in the direction of the thread can be additionally achieved. Both reinforcing and non-reinforcing fixing threads are used for sewing together reinforcing fibers on the base or in the combination of fiber preforms. Furthermore, woven reinforcing fabrics and/or reinforcing fibers can also be sewn together by means of the fixing threads to form complex fiber preforms without a base.

The finished composite component is formed in a known way by impregnation of the fiber preform with a curable polymer material or a resin system that can be cured by crosslinking, in particular an epoxy resin, a polyester resin, a BMI resin or the like, and the subsequent curing of the polymer material, whereby a matrix enclosing the fiber preform is formed from the curable polymer material. The known RTM process ("Resin Moulding Transfer") can be used, for example, for this.

In the case of the likewise already known TFP process ("Tailored Fiber Placement") for the forming of fiber preforms, a reinforcing fiber with a fixing thread is, for example, attached on a planar base with the aid of a CNC automatic sewing or embroidering machine. The fiber orientation can be set here almost at will and changed during the laying operation, so that an optimum adaptation of the fiber orientation to the mechanical forces that are to be absorbed by the later composite component can be achieved.

When conventional fixing threads are used, for example polyester filaments or the like, however, there may be a worsening of the mechanical properties of the fiber-reinforced composite component, since undulations and/or breakages of reinforcing fibers may occur in the region of the fixing threads and microcracks may occur in the region of the matrix. One of the reasons for the occurrence of the microcracks is accumulations of resin in the regions where the fixing threads penetrate. Since the matrix is partly very brittle, the formation of microcracks may occur here on account of differing coefficients of thermal expansion and abrupt changes in rigidity.

To improve the mechanical properties of composite components, it is also known to use fixing threads which can be dissolved in particular in the TFP process. Among the effects of fixing threads dissolving after completion of the sewing operation is that the undulations of the reinforcing fibers that are caused by the fixing threads are reduced. Furthermore, the dissolvable fixing thread goes into solution before the curing process in the matrix and, given a suitable choice of material, can additionally improve its impact strength, so that fewer microcracks form in the regions where the fixing threads penetrate.

However, the soluble fixing threads are only conditionally suitable for the TFP process or other sewing methods, since they do not have the required mechanical processing properties of conventional fixing threads and consequently thread breakages, filament detachments, split ends, etc. can occur. Furthermore, the entire material of the soluble fixing threads can spread out in an uncontrolled manner over the entire matrix and lead to undefined mechanical changes of the overall composite component.

The object of the invention is to achieve a local increase in ductility in the region of the sewing in the matrix, with simultaneous optimum processing properties of the fixing thread, in the production of fiber preforms, for example by the TFP process.

This object is achieved by a fixing thread according to the characterizing clause of Patent Claim 1.

The fact that the fixing thread has an interface, in particular for the local increase in ductility of a matrix formed by the curable polymer material, and at least one core thread, means that the mechanical properties of the finished composite component are improved as a result of a reduced tendency for microcracks to form in the region of the locations where the fixing thread penetrates. At the same time, the fixing thread according to the invention makes optimum processability of the fixing thread possible, in particular when the "TFP" process is applied. In addition, the interface makes it possible to obtain just a local increase in the ductility of the resin matrix in the region of the fixing thread, so that impairment of the mechanical properties of the rest of the resin matrix is largely ruled out. In addition, the fixing thread according to the invention can be processed easily and at high speed on already known CNC automatic sewing or embroidering machines without any major structural modifications.

In addition, the fixing thread according to the invention also makes it possible for laid fiber strands of reinforcing fibers to be sewn together to create sheet-like reinforcing formations. Such sheet-like reinforcing formations are, for example, woven or nonwoven fabrics of carbon fibers, glass fibers, aramid fibers or the like.

A further advantageous refinement of the fixing thread according to the invention provides that the core thread or the core threads improve the processability of the interface and/or influence the mechanical properties of the composite component.

As a result, use of the fixing thread according to the invention, which is formed by a combination of at least one core thread with an interface of a thermoplastic material, on high-speed automatic, in particular CNC-controlled, sewing or embroidering machines or the like is possible, for the production of fiber preforms by the TFP process.

In accordance with a further advantageous refinement, it is provided that the core thread or the core threads are formed by a thread material ensuring adequate processability, in particular by a polyester material or the like.

In particular, a core thread formed with polyester makes it possible to obtain good resultant processability of the fixing thread, which is formed by the combination of at least one core thread with the interface of a thermoplastic material. The term good processability is meant to mean, inter alia, that the fixing thread can be processed in particular on automatic sewing or embroidering machines without breakages, elongations, thread ruptures or the like.

According to a further advantageous refinement, the core thread or the core threads are formed by a material which can withstand high mechanical loads, particular by glass fibers, by carbon fibers, by aramid fibers or the like.

As a result, the fixing thread may initially serve for the attaching and fixing of the reinforcing fibers, but if required also absorb mechanical forces to an appreciable extent in the direction of a longitudinal axis of the fixing threads, to supplement the reinforcing fibers, in the finished composite component. In addition, it is possible to form the core thread itself from a plurality of filaments, that is to say, for example, from individual glass fibers, carbon fibers, aramid fibers or the like.

In accordance with a further advantageous refinement, the fixing thread has a substantially circular circumferential contour.

As a result, the fixing thread can be processed on already known automatic CNC sewing or embroidering machines easily and generally without any major adaptations on the machine side.

According to a further advantageous refinement of the invention, the interface is formed by enclosing at least portions of at least one core thread with a polymer material, in particular with a thermoplastic polymer material.

This allows the fixing thread according to the invention to be formed in a simple way by enclosing a conventional fixing thread, for example a polyester filament, with the thermoplastic material. By enclosure with the thermoplastic material, the ductility of the resin matrix or resin system surrounding the fixing thread is only increased locally. One result is that the tendency for microcracks to form in the regions where the fixing threads penetrate is reduced and at the same time uncontrolled permeation of the resin matrix with the thermoplastic material is avoided. Furthermore, the enclosure, which has only a relatively small material thickness, has the effect that only a relatively small volume of the thermoplastic material is released into the matrix during the curing process, so that according to the invention there is only a local change in the ductility of the matrix.

A further advantageous refinement of the invention provides that the interface is formed by a bonding of at least one core thread with an interface thread of a polymer material, in particular of a thermoplastic polymer material.

This involves a core thread with a, for example, substantially semicircular cross-sectional geometry being bonded in the region of the baseline of the semicircle with an interface thread with a likewise, for example, substantially semicircular cross-sectional geometry, so that a fixing thread with a likewise substantially semicircular cross-sectional geometry is produced. The bonding of the core thread with the interface thread, formed for example from a polypropylene material, may take place, for example, by fusing the thermoplastic material to the core thread. Cross-sectional geometries other than that of a circle, of virtually any desired form, are possible here.

In accordance with a further advantageous refinement, the interface is formed by a twisting of at least one core thread with at least one interface thread of a polymer material, in particular a thermoplastic polymer material.

This allows the fixing thread according to the invention to be formed in a particularly simple way by prefabricated semifinished products, for example a conventional polyester fixing thread and a thermoplastic thread.

Figure 2:
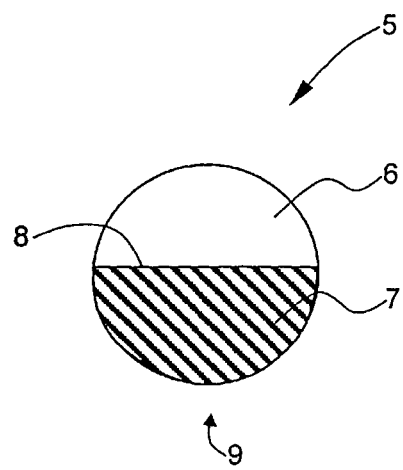
Figure 3:
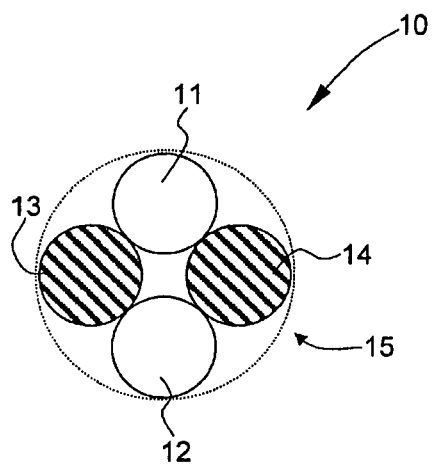
Figure 4:
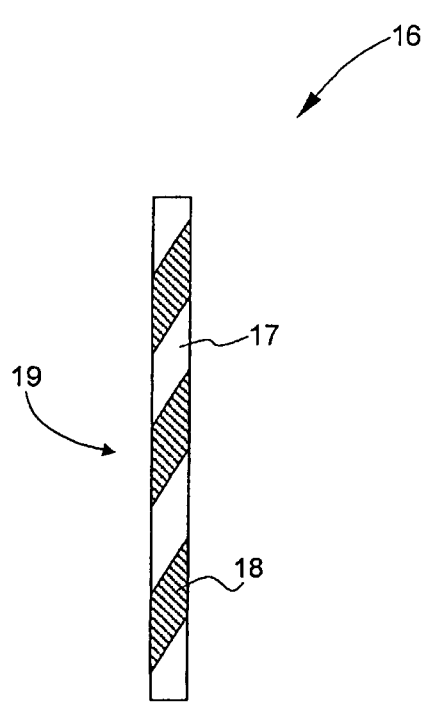

In the drawing:

FIG. 1 shows a cross section through a first exemplary embodiment of the fixing thread according to the invention, FIG. 2 shows a cross section through a second exemplary embodiment of the fixing thread according to the invention, FIG. 3 shows a cross section through a third variant of the fixing thread according to the invention and FIG. 4 shows a plan view of a portion of a fourth variant of the fixing thread according to the invention.

FIG. 1 shows a cross section through a first exemplary embodiment of the fixing thread according to the invention. A fixing thread 1 is formed by a core thread 2, which has an enclosure 3 of a thermoplastic material to form an interface 4. The core thread 2 is a conventional fixing thread, for example a polyester thread which can only undergo low mechanical loads, or the like. The enclosure 3 represents the interface 4 with respect to the surrounding matrix of the curable polymer material, which is not represented, whereby the desired local increase in ductility of the surrounding matrix is obtained, in particular in the regions where the fixing thread 1 penetrates, so that the tendency for microcracks to form in the matrix of the finished composite component is reduced significantly by the use of the fixing thread 1. During the curing process, the thermoplastic material of the enclosure 3 distributes itself locally in the boundary region between the fixing thread and the matrix. The enclosure 3 is formed from a suitable thermoplastic polymer material, for example from polyethylene, from polypropylene or the like, and has a small material thickness in relation to the diameter of the core thread 2, so that entry of the thermoplastic material into the matrix during the curing process is minimized. The curable polymer material or the resin system that can be cured in particular by crosslinking to form the matrix is, for example, an epoxy resin, a polyester resin, a BMI resin or the like.

FIG. 2 and FIG. 3 show cross-sectional representations through alternative embodiments of the fixing thread according to the invention.

The fixing thread 5 in FIG. 2 is formed in turn by a core thread 6 and an interface thread 7, which are bonded to each other in the region of a baseline 8, for example by fusing of the interface thread 7 or the like that is formed by a thermoplastic material. With preference, the core thread 6 and the interface thread 7 respectively have an approximately semicircular cross-sectional geometry, so that the fixing thread 5 has a substantially circular cross-sectional geometry. In this case, the interface thread 7 forms the actual interface 9, which according to the invention brings about the local increase in ductility in the region of the surrounding matrix, which is not represented. The core thread 6 is in turn a conventional fixing thread, for example a polyester filament or the like.

The fixing thread 10 in the representation of FIG. 3 is formed by two core threads 11, 12 and two interface threads 13, 14. Here, the fixing thread 10 has a substantially circular circumferential contour, as indicated by the dotted circumferential line. The core threads 11, 12 are in turn conventional fixing threads, for example polyester filaments or the like. By contrast, the interface threads 13, 14 are formed by a thermoplastic material to form an interface 15, which likewise serves for the local increase in the ductility in the boundary region with respect to the matrix.

FIG. 4 shows a plan view of a portion of a fourth variant of the fixing thread according to the invention. The fixing thread 16 has a core thread 17 and extends parallel to the plane of the drawing. The core thread 17 is wound around spirally by an interface thread 18 of a thermoplastic material to form a ductility-increasing interface 19. The winding may also take place, for example, with more than one layer, the winding direction changing from layer to layer.

Instead of being formed by conventional fixing threads, which usually consist of a polyester material or the like, the core threads 2, 6, 11, 12 and 17 may also be formed at least partially by threads which consist of a thread material that can undergo high mechanical loads, so that, in addition to the actual fixing function within the fiber preform, the fixing threads formed in this way can absorb mechanical forces to an appreciable extent in the direction of the respective longitudinal axes of the fixing threads within the finished composite component. Bundles of individual glass fibers, carbon fibers or aramid fibers come into consideration, for example, as thread material that can withstand high loads.

By contrast, in all the variants shown the interface threads 7, 13, 14 and 18 are formed by a thermoplastic material, for example by polypropylene, polyethylene or the like, in order to achieve the defined local increase in ductility of the matrix in the boundary region between the said matrix and the fixing thread that is aimed for by the invention.

The fixing threads 1, 5, 10, 16 according to the invention may also be used, for example, for the production of continuous woven or nonwoven fabrics in strip form with fiber strands of reinforcing fibers, such as, for example, carbon fibers, glass fibers, aramid fibers or the like. Woven or nonwoven fabrics of this type are also referred to by the term sheet-like reinforcing formations. In this case, the fiber strands of reinforcing fibers that have been laid one on top of the other or interwoven are, for example, sewn together by means of the fixing threads 1, 5, 10, 16, and consequently secured against unwanted positional changes, etc.

The invention accordingly relates to a fixing thread 1, 5, 10, 16 for sewing together reinforcing fibers, in particular to form a fiber preform, for the production of a fiber-reinforced composite component by means of impregnation with a curable polymer material, the fixing thread having an interface 4, 9, 15, 19, in particular for locally increasing the ductility of a matrix formed by the curable polymer material, and having at least one core thread 2, 6, 11, 12, 17.

The core thread 2, 6, 11, 12 and 17 or the core threads 2, 6, 11, 12, 17 improve the processability of the interface 4, 9, 15, 19 and/or influence the mechanical properties of the composite component, for example.

The core thread 2, 6, 11, 12 and 17 or the core threads 2, 6, 11, 12, 17 are preferably formed by a thread material ensuring adequate processability, in particular by a polyester material or the like.

The core thread 2, 6, 11, 12, 17 or the core threads 2, 6, 11, 12, 17 are also preferably formed by a material that can undergo high mechanical loads, in particular by glass fibers, by carbon fibers, by aramid fibers or the like.

The fixing thread 1, 5, 10, 16 advantageously has a substantially circular circumferential contour.

The interface 4 is formed, for example, by an enclosure 3 around at least portions of at least one core thread 2 with a polymer material, in particular with a thermoplastic polymer material.

The interface 9 is formed in particular by a bonding of at least one core thread 6 with an interface thread 7 of a polymer material, in particular of a thermoplastic polymer material.

The interface 15 is also advantageously formed by a twisting of at least one core thread 11, 12 with at least one interface thread 13, 14 of a polymer material, in particular of a thermoplastic polymer material.

Moreover, the interface 19 is formed, for example, by at least one core thread 17 being wound around by at least one interface thread 18 in strip form of a polymer material, in particular of a thermoplastic polymer material.

LIST OF REFERENCE NUMERALS 1 fixing thread
 2 core thread
 3 enclosure
 4 interface
 5 fixing thread
 6 core thread
 7 interface thread
 8 baseline
 9 interface
 10 fixing thread
 11 core thread
 12 core thread
 13 interface thread
 14 interface thread
 15 interface
 16 fixing thread
 17 core thread
 18 interface thread
 19 interface

What is claimed is:

1. In a fiber preform for production of a fiber-reinforced composite component by impregnation with a curable polymer material, the improvement comprising a fixing thread with which reinforcing fibers of the preform are sewn or fixed together, wherein the fixing thread comprises an interface of a thermoplastic polymer material to locally increase ductility of a matrix formed by the curable polymer material in the regions where the fixing thread penetrates or projects into the matrix, the fixing thread having at least one core thread, which is formed by a plurality of filaments of carbon fibers, wherein the at least one core thread has a semicircular cross-sectional geometry and wherein the interface comprises an interface thread with a semicircular cross-sectional geometry which is bonded to the at least one semi-circular core thread.

2. The improvement of claim 1, wherein the fixing thread has a substantially circular circumferential contour.

3. The improvement of claim 1, wherein the fixing thread includes a plurality of core threads, with each core thread comprising a plurality of filaments of carbon fibers.

4. In a fiber preform for production of a fiber-reinforced composite component by impregnation with a curable polymer material, the improvement comprising a fixing thread with which reinforcing fibers of the preform are sewn or fixed together, wherein the fixing thread comprises an interface of a thermoplastic polymer material to locally increase ductility of a matrix formed by the curable polymer material in the regions where the fixing thread penetrates or projects into the matrix, the fixing thread having a plurality of core threads, each of which is formed by a plurality of filaments of carbon fibers, wherein the interface comprises at least one interface thread, wherein the plurality of core threads and the at least one interface thread are twisted with one another.

5. The improvement of claim 4, wherein the fixing thread has a substantially circular circumferential contour.

6. In a fiber preform for production of a fiber-reinforced composite component by impregnation with a curable polymer material, the improvement comprising a fixing thread with which reinforcing fibers of the preform are sewn or fixed together, wherein the fixing thread has a substantially circular circumferential contour and comprises an interface of a thermoplastic polymer material to locally increase ductility of a matrix formed by the curable polymer material in the regions where the fixing thread penetrates or projects into the matrix, the fixing thread having at least one core thread, which is formed by a plurality of filaments of carbon fibers, wherein the interface comprises at least one interface thread in strip form, which is wound around the at least one core thread.

7. The improvement of claim 6, wherein the fixing thread includes a plurality of core threads, with each core thread comprising a plurality of filaments of carbon fibers.

8. In a fiber-reinforced composite component produced by impregnation of a fiber preform with a curable polymer material, the improvement comprising a fixing thread with which reinforcing fibers of the preform are sewn or fixed together, wherein the fixing thread comprises an interface of a thermoplastic polymer material which locally increases ductility of a matrix formed by the curable polymer material in the regions where the fixing thread penetrates into the matrix, the fixing thread having at least one core thread, which is formed by a plurality of filaments of carbon fibers, wherein the at least one core thread has a semicircular cross-sectional geometry and wherein the interface comprises an interface thread with a semicircular cross-sectional geometry which is bonded to the semi-circular core thread.

9. The improvement of claim 8, wherein the fixing thread has a substantially circular circumferential contour.

10. The improvement of claim 8, wherein the fixing thread includes a plurality of core threads, with each core thread comprising a plurality of filaments of carbon fibers.

11. In a fiber-reinforced composite component produced by impregnation of a fiber preform with a curable polymer material, the improvement comprising a fixing thread with which reinforcing fibers of the preform are sewn or fixed together, wherein the fixing thread comprises an interface of a thermoplastic polymer material which locally increases ductility of a matrix formed by the curable polymer material in the regions where the fixing thread penetrates into the matrix, the fixing thread having a plurality of core threads, each of which is formed by a plurality of filaments of carbon fibers, wherein the interface comprises at least one interface thread, wherein the core threads and the at least one interface thread are twisted with one another.

12. The improvement of claim 11, wherein the fixing thread has a substantially circular circumferential contour.

13. In a fiber-reinforced composite component produced by impregnation of a fiber preform with a curable polymer material, the improvement comprising a fixing thread with which reinforcing fibers of the preform are sewn or fixed together, wherein the fixing thread has a substantially circular circumferential contour and comprises an interface of a thermoplastic polymer material which locally increases ductility of a matrix formed by the curable polymer material in the regions where the fixing thread penetrates into the matrix, the fixing thread having at least one core thread, which is formed by a plurality of filaments of carbon fibers, wherein the interface comprises at least one interface thread in strip form which is wound around the at least one core thread.

14. The improvement of claim 13, wherein the fixing thread includes a plurality of core threads, with each core thread comprising a plurality of filaments of carbon fibers.

\* \* \* \* \*